United States Patent [19]

Nordström

[11] Patent Number: 4,580,210

[45] Date of Patent: Apr. 1, 1986

[54] CONTROL SYSTEM HAVING VARIABLY BIASED MANIPULATABLE UNIT

[75] Inventor: Lennart Nordström, Linköping, Sweden

[73] Assignee: Saab-Scania Aktiebolag, Linköping, Sweden

[21] Appl. No.: 601,260

[22] Filed: Apr. 17, 1984

[30] Foreign Application Priority Data

Apr. 18, 1983 [SE] Sweden .............................. 8302137

[51] Int. Cl.⁴ ..................... G05B 9/02; G05B 11/01; B64C 13/04; B64C 11/34
[52] U.S. Cl. .................................. 364/190; 364/424; 364/176; 318/628; 318/580; 244/223; 244/227; 244/230; 244/17.13
[58] Field of Search ............... 364/142, 148, 167, 170, 364/174, 175, 176, 188, 190, 424; 318/583, 584, 585, 586, 609, 628, 580; 244/223, 227, 221, 220, 230, 195, 194, 17.13

[56] References Cited

U.S. PATENT DOCUMENTS

| | | | |
|---|---|---|---|
| 4,078,749 | 3/1979 | Johnson, Jr. | 244/17.13 X |
| 4,106,728 | 8/1978 | Griffith | 318/628 X |
| 4,236,685 | 12/1980 | Kissel | 244/195 X |
| 4,294,162 | 10/1981 | Fowler et al. | 364/190 X |
| 4,313,165 | 1/1982 | Clelford et al. | 364/190 X |
| 4,382,281 | 5/1983 | Fowler et al. | 244/17.13 X |
| 4,417,308 | 11/1983 | Wright et al. | 244/194 |
| 4,477,043 | 10/1984 | Repperger | 244/223 |
| 4,527,242 | 7/1985 | McElreath et al. | 244/17.13 X |

Primary Examiner—Jerry Smith
Assistant Examiner—Jon D. Grossman
Attorney, Agent, or Firm—James E. Nilles; James R. Custin

[57] ABSTRACT

In a control system having a manipulatable unit, such as an aircraft stick, which is biased toward a neutral position to provide control "feel", an input which at each instant signifies the position of displacement of the stick from its neutral position is processed to provide an output signifying the magnitude of the biasing force to be applied to the stick. In a range of positions spaced to one side of its neutral position (or in such a range at each side of neutral) the output provides for a steep biasing force gradient as the stick is moved through a predetermined distance in either direction from a turning point to which the stick had been brought by movement in the opposite direction. For all other movements of the stick within that range the biasing force has a low gradient. The higher gradient of bias for small trimming movements provides better feel for trimming without requiring stick bias to be unduly stiff during coarser stick displacements.

6 Claims, 5 Drawing Figures

CONTROL SYSTEM HAVING VARIABLY BIASED MANIPULATABLE UNIT

BACKGROUND OF THE INVENTION

Field of the Invention

This invention relates to control systems that have a controlled device which is actuated in response to displacements of a manipulatable control unit and wherein the control unit is subjected to a bias that opposes its displacement to provide a simulated feedback or "feel" that facilitates precise control; and the invention is more particularly concerned with a method and apparatus for varying the bias upon the control unit in accordance with predetermined criteria, to provide a "feel" that facilitates both maneuvering and trimming manipulations of the control unit.

The system for pitch control of an aircraft can be taken as typical of the various types of control systems that involve the problems and requirements addressed by this invention.

In lighter aircraft, wherein the stick or manipulatable control unit is directly linked to the related control surfaces, the biasing forces on the stick are generated by aerodynamic forces on the actuated surfaces to which it is linked, and the pilot thus becomes accustomed to interpreting stick forces as having a relationship to the forces that the control surfaces exert for changing the attitude of the aircraft. Thus the stick biasing forces constitute a feedback that assists the pilot in controlling the aircraft.

In high performance aircraft, where the stick is not directly linked to the control surfaces, a biasing force is artificially imposed upon the stick or manipulatable control unit, to yieldingly oppose its displacement away from the neutral position and yieldingly urge it back toward that position. This force gives the pilot information about the amount of displacement that he is imparting to the stick, in effect synthesizing the natural feedback or "feel" of a directly connected control system.

Conventionally, the force thus imposed upon the stick increases with increasing displacement of the stick from its neutral or null position, requiring a relatively high muscular effort for large stick deflections. Biasing the stick with a force having a gradually increasing gradient is satisfactory for large, coarse stick displacements, intended to bring about rapid change of aircraft attitude in maneuvering flight, but it has a negative influence upon fine control, accomplished with small displacements of the stick whereby the aircraft is trimmed for small changes in its attitude. Such trimming often takes place with small displacements of the stick near its null position, as in adjusting the level flight attitude, but it can occur in other parts of the range of control stick displacement, as when the attitude of a diving or steeply climbing fighter airplane is adjusted for gun aiming. Upon a reversal of the direction of stick displacement such as characterizes a trimming manipulation, there should be no change in the force that biases the stick toward its neutral position at the beginning of the reversing movement, but during that movement it is desirable that there be a high information-transmitting gradient of stick force, so that a small displacement of the stick is attended by relatively large change in biasing force upon it.

With a conventional manually controllable trim system it is possible to obtain a rather accurately controlled small change in aircraft attitude, even with large stick deflections and load factors. However, the employment of the trim system at large stick displacements has marked disadvantages that are not acceptable for high performance aircraft. The trim system is controlled by a manually operable nose-up/nose-down reversing switch that requires special attention and manipulation. It tends to respond somewhat slowly. If the trim system is actuated during a maneuver involving large displacement of the control stick, then upon return of the stick to its neutral position the aircraft will not return to the same flight attitude that existed before trimming.

Although the above described inconveniences are especially troublesome in control systems for high performance fighter aircraft, where quick and reliable control commands and reactions are demanded by the pilot, similar inconveniences are also presented by control systems in other applications.

SUMMARY OF THE INVENTION

The general object of the present invention, therefore, is to provide a method of so varying the bias upon the manipulatable control unit in a control system of the character described as to provide the stick or other manipulatable control unit with a biasing force that has a low gradient for conditions under which the stick is manipulated through relatively large maneuvering displacements but a substantially higher gradient when the stick is manipulated through relatively small trimming displacements.

More specifically it is an object of this invention to provide a control system of the character described wherein the manipulatable control unit is biased to its neutral or null position with a biasing force that is automatically varied to provide for the imposition upon the control unit of a low gradient biasing force at times when large, coarse displacements of the control unit are being made and to provide for imposition upon it of a relatively high gradient biasing force when small, trimming displacements are being made.

It is also an object of this invention to provide a method of automatically varying the biasing force upon the manipulatable control unit of a control system of the character described, which method is particularly well suited for the pitch control system of a high performance aircraft and is capable of being implemented with available devices that are simple, reliable and inexpensive.

BRIEF DESCRIPTION OF THE DRAWING

In the accompanying drawings, which illustrate what is now regarded as the preferred mode of practicing the method of this invention.

DESCRIPTION OF THE PREFERRED EMBODIMENTS

Figure 1:
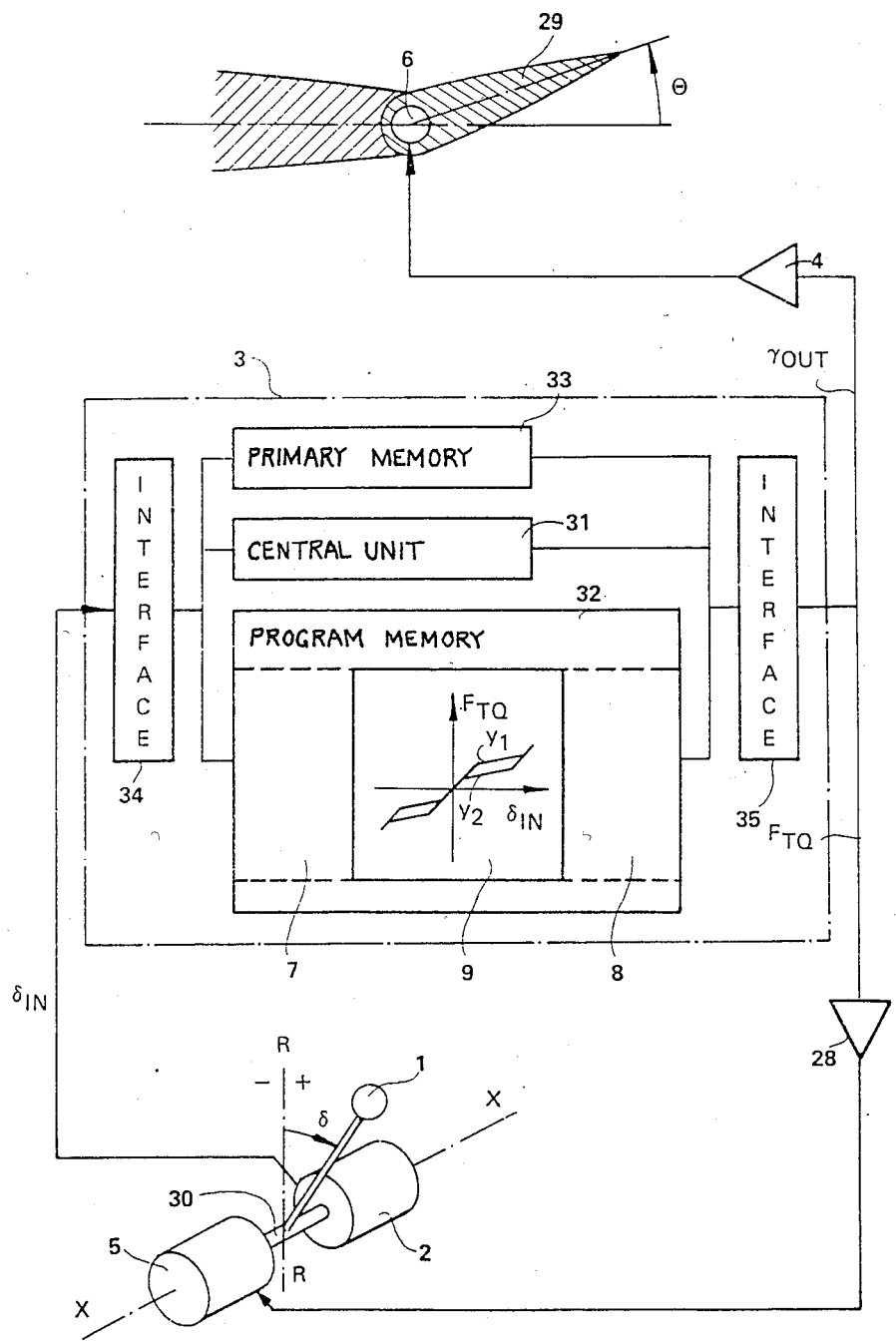
FIG. 1 schematically depicts a control system for the pitch control of an aircraft, typical of systems to which the method of this invention is applicable.

A control system to which the method of this invention is applicable comprises a manipulatable control unit 1, which is here illustrated as an aircraft control stick. In this case the control unit is supported for swinging displacement about an axis X—X, but it could as well be displaceable in translation. The control unit 1 will in any case have a neutral or null position, designated by R—R, towards and from which it is displaceable; and it may be displaceable away from the null position in only one direction or, as in the case of the aircraft stick here illustrated, in both directions.

While such a stick also controls roll functions, it may be noted here that the method of this invention would not normally be appropriate for the roll channel in an aircraft system because fine control of roll normally takes place around the neutral position, and a uniform gradient of bias through the neutral position seems to meet the requirements best.

Connected to the control unit 1 is a signal transmitter 2 that generates an input which can be in analog form, as a steady signal of varying magnitude, or can be in digital form. Digital signals are generated at regular intervals, typically at a frequency of 100 Hz. In either case the input has a magnitude $\delta_{IN}$ that unambiguously corresponds to the existing position of displacement of the control unit 1. For simplicity, the magnitude $\delta_{IN}$ can be considered to be the same thing as the input itself. In the case of digital input signals, each can be considered as identifying a position of the control unit, and the instantaneous magnitude of an analog input likewise signifies the then-existing position of that unit. It is here assumed that the input $\delta_{IN}$ is negative for control unit positions at the stick-forward side of the null position and positive for positions at its stick-back side.

The input from the transmitter 2 is fed to a computing unit 3 by which an actuating output $\gamma_{OUT}$ is produced that may be in digital or analog form. The computing unit 3 is connected with an amplifier 4 from which the actuating output, as amplified, is in turn fed to a controlled device comprising an actuating instrumentality or servo mechanism 6 and a control surface 29 that is mechanically linked to the servo mechanism. The controlled device 6, 29 is actuated in response to the amplified output, to bring it to a position of displacement $\theta$ that is dependent upon the position of displacement $\delta_{IN}$ of the control unit 1 and upon other criteria that may include flight conditions and load factors. The copending application of the applicant, Ser. No. 601,644, filed Apr. 18, 1984, describes a method of controlling actuation of the controlled device in accordance with other criteria relating to the manner in which the control unit is manipulated.

For the purposes of the present invention the computing unit 3 also produces an output $F_{TQ}$ that has, at each instant, a magnitude dependent upon the then-existing magnitude of the input signal $\delta_{IN}$ and also upon other criteria that are explained hereinafter. The output $F_{TQ}$, after suitable amplification in an amplifier 28, is fed to a force generating unit 5 that is coupled to the control unit 1. In the case of a control unit that is swingable about an axis, the force generating unit 5 can be a torque motor that acts directly upon the axle 30 upon which the control stick is swingable, as schematically shown in FIG. 1. The force generating unit 5 imposes upon the control unit 1 a biasing force that yieldingly opposes its displacement away from its neutral position. The magnitude of that biasing force is at any instant proportional to the existing magnitude of the output $F_{TQ}$; hence the magnitude of the output $F_{TQ}$ constitutes a demand value and signifies a biasing force.

For the method of this invention as practiced with digital signals the computing unit 3 is preferably a data processor that is programmed for the algorithms needed for various control situations. However, for a control system that has a low requirement for speed, the computing unit can comprise discrete components for working through the algorithms digitally or in analog form.

The data processor comprises, in general, a central unit 31, a program memory 32 and a primary memory 33. Interfaces 34 and 35, respectively connected to the input and to the output of the data processor, match the input $\delta_{IN}$ to the data processor, match the actuation output $\gamma_{OUT}$ to the amplifier 4 and the servo unit 6, and match the output $F_{TQ}$ to the amplifier 28 and the force generating unit 5.

The data processor 3 is programmed to work through an algorithm, explained hereinafter, whereby, it determines, for each generated input signal $\delta_{IN}$, the magnitude of the output signal $F_{TQ}$ that is to be produced in response to that input signal. The algorithm is stored in the program memory 32, and the box 9 in FIG. 1 designates a known type of instrumentality by which it is worked through. The input signals $\delta_{IN}$ may be subjected to other processing, as denoted by the boxes 7 and 8 in FIG. 1 for the purpose of producing the actuating signals $\gamma_{OUT}$ for the controlled device.

The direction of control unit movement away from the null position is herein designated the "increase" direction, since such movement effects an increased deflection of the controlled device, and the opposite direction of control unit displacement is designated the "decrease" direction.

Figure 2:
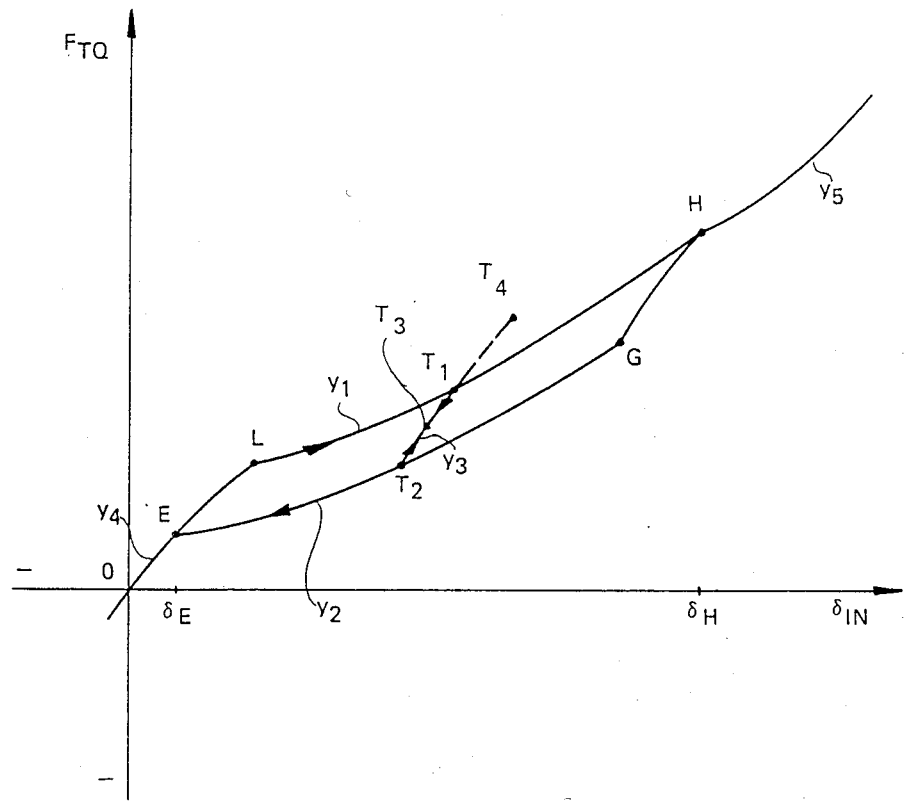
FIG. 2 is a diagram of the basic relationships between input and output signal magnitudes according to the method of this invention.

FIG. 2 represents, for positive (stick back) displacements of the control stick, the relationships between input signals $\delta_{IN}$ and output signals $F_{TQ}$. In a first range of positions of displacement of the stick or control unit, extending from the null or neutral point O to a position designated by $\delta_E$, the system operates with a high gradient, that is, the biasing force rises steeply with displacement of the stick in the increase direction. Hence, a given increment or decrement of stick displacement is attended by a relatively large change in biasing force upon the stick, as denoted by the line segment OE, which represents a sequence of relationships between input signals $\delta_{IN}$ and output signals $F_{TQ}$. Within that O–$\delta_E$ range this high gradient facitliates accurate trimming in attitudes of substantially level flight.

In a second range of control unit positions, between the position $\delta_E$ and a position $\delta_L$, the system continues to operate with substantially the high gradient just mentioned, as denoted by the line segment EL, provided the stick is moved continuously in the increase direction or is manipulated through successive displacements that carry it only in the increase direction. However, if such continued displacement in the increase direction carries the stick beyond the position $\delta_L$, then with continued movement in the increase direction, or with a succession of displacements that are only in the increase direction, the system operates with a different and substantially lower gradient, as denoted by the line segment LH. Each of the line segments EL and LH again represents a sequence of relationships between input signals $\delta_{IN}$ and output signals $F_{TQ}$.

Depending upon characteristics designed into the particular control system, the point $\delta_H$ may be at the limit of displacement of the stick in the increase direction, or there may be a range of positions of the stick between its $\delta_H$ position and its limit position; and in the latter case the force gradient in that range, for both directions of control unit movement, may be different from the force gradient in the low gradient range $\delta_L$-$\delta_H$, and may be the same as, or different from, the gradient in the initial range O-$\delta_E$.

The conditions that arise upon reversals of direction of stick displacement in the range $\delta_L$-$\delta_H$ are discussed below. At this point, consideration is given to the manner in which the system operates when the stick is in a range of displacements between the position $\delta_E$ and a position $\delta_G$ which is intermediate the positions $\delta_L$ and $\delta_H$, and during movement of the stick steadily in the decrease direction or through a succession of displacements only in the decrease direction. Under those conditions the relation between the input signal $\delta_{IN}$ and the output signal $F_{TQ}$ will be as denoted by the line segment GE, which represents another sequence of relationships between input signals and output signals. It will be noted that the line segment GE lies below the above discussed line segment LH, but its slope or gradient $\dot{y}_2$ is equal to—or at least generally similar to—the slope or gradient $\dot{y}_1$ of the segment LH, so that the line segments GE and LH are more or less parallel to one another. What this relationship signifies is that if the stick is displaced through a given distance, the respective changes in biasing force $F_{TQ}$ that are depicted by the respective line segments LH and GE will be equal—or substantially so—and relatively low; but for a given position of displacement of the stick, the corresponding point on the segment GE designates a lower biasing force on the stick than the corresponding point on the segment LH.

If the control unit is in the range between its $\delta_E$ and $\delta_H$ positions and has first been displaced through a substantial distance in one direction and is then moved in the opposite direction, such reversal of direction of displacement can be regarded as a turning point. In FIG. 1, $T_1$ designates a turning point at which the direction of stick displacement has been reversed from increase to decrease, and $T_2$ designates a turning point at which the direction of stick displacement has been reversed from decrease to increase. After the stick has passed a turning point $T_1$ or $T_2$, and as it is displaced in the new direction through a limited distance from that turning point, the relationship of output signals $F_{TQ}$ to input signals $\delta_{IN}$ will be as depicted by the line $y_3$ in FIG. 2. It will be observed that the slope $\dot{y}_3$ of the line segment $y_3$ is on the order of the slope $\dot{y}_4$ of the line segments OE and EL, which is to say that it represents a relatively high or steep gradient whereby a given increment or decrement of control stick displacement is attended by a relatively large increase or decrease in the biasing force upon the control stick.

The line $y_3$ in FIG. 2 is one of a set of lines which can be visualized as drawn across the segments LH and GE to represent relationships of input to output signals after each of various turning points, each line of that set having a slope or gradient equal to—or substantially equal to—that of the illustrated line $y_3$. It will be noted that the line segment EL is in effect a member of this set, as is the line segment GH.

The several line segments EL, LH, HG and GE can be regarded as defining a belt-like modulation zone ELHGE wherein output signals $F_{TQ}$ are dependent not only upon their related input signals $\delta_{IN}$ but also upon the manner in which the stick had been manipulated immediately before each output signal was produced. Thus, during a stick displacement in the range of displacement positions between $\delta_E$ and $\delta_H$ there will be either a relatively small (low gradient) change in biasing force upon the stick or a relatively large (high gradient) change in that biasing force, depending upon the manner in which the pilot manipulates the stick. In every case the biasing force will of course increase as the stick is moved in the increase direction and decrease as it is moved in the decrease direction, but the rate of such increase or decrease will depend upon whether the pilot is making a maneuvering displacement of the stick or a trimming displacement of it. These changes in biasing force are brought about by operation of the torque motor 5 as the stick is being displaced, to provide, at every instant, the biasing force signified by the then-current output signal $F_{TQ}$. The output signal produced in response to every input signal in the range between $\delta_E$ and $\delta_H$ can be visualized as lying in the modulation zone ELHGE or on one of the segments that bound it.

At this point it may be observed that each of the several line segments OE, EL, LH, GE and $y_3$ may be either rectilinear or curvilinear, that is, it may have either a constant slope or gradient or one that increases in a non-uniform manner. Also, since the segments LH and GE need not be exactly parallel, the modulation zone ELHGE may be either wider or narrower at its top than at its bottom.

Figure 3:
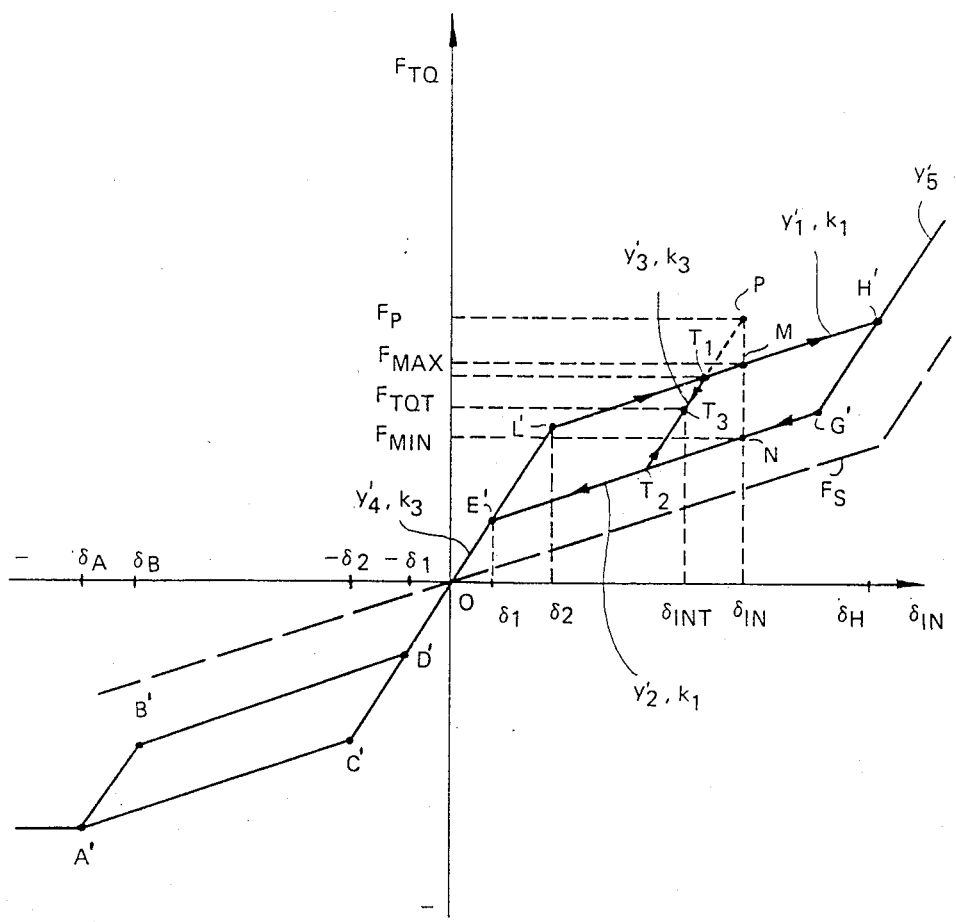
FIG. 3 is a diagram generally similar to FIG. 2 but more particularly showing the input and output signal relationships in a control system applicable to pitch control of an aircraft.

In the control system illustrated in FIG. 2 each of the sequences of input signal to output signal relationships is shown as having a generally curvilinear form, but in many applications, including aircraft pitch control channels, every sequence can be rectilinear, that is, can have a constant gradient. Accordingly FIG. 3 is a diagram for an aircraft pitch control system having rectilinear sequences of input signal to output signal relationships and having a modulation zone E'L'H'G'E' corresponding to the modulation zone for stick-back positions shown in FIG. 2 and a second generally similar zone A'B'D'C'A' for forward stick positions. As is conventional, the stick-forward zone A'B'D'C'A' is limited to a smaller range of stick positions than the stick-back zone E'L'H'G'E'. The diagram is in other respects the same for both sides of the neutral point O.

The manner in which the system functions to select the biasing force in accordance with the manner in which the control unit is manipulated will be more fully understood in the light of the following explanation of the invention in its method aspect.

The line segment OE' in FIG. 3 represents a first sequence of relationships between input signal magnitudes and output signal magnitudes that is defined and stored in the memory of the system. The sequence may be in the form of discrete values, or it can have the form of a function that defines a continuum of values. The output magnitudes $F_{TQ}$ in this first sequence are related to respective input signals $\delta_{IN}$ that designate positions of the control unit 1 between its null position and a position $\delta_E$ that is spaced from the null position by a predetermined distance in the increase direction. The output signal magnitudes $F_{TQ}$ in this first sequence have a gradient $k_3$ of increase in the increase direction relative to their related input signal magnitudes, which gradient, as explained above, is relatively high or steep.

The line segment G'E' represents a second sequence of relationships between input and output signal magnitudes, likewise stored in the system memory either as discrete values or as a function. The output signals $F_{TQ}$ of this second sequence are related to respective input signals $\delta_{IN}$ that designate positions of the control unit 1 between its $\delta_E$ position and a predetermined position $\delta_G$ that is spaced a substantial distance beyond $\delta_E$ in the increase direction. The output signal magnitudes in this second sequence have a second gradient $k_1$ of increase in the increase direction, said second gradient being substantially lower—that is, less steep—than the gradient $k_3$.

The line segment L'H' represents a third sequence of relationships between input and output signal magnitudes, likewise stored in the system memory either as discrete values or as a function. The output signals $F_{TQ}$ of this third sequence are related to respective input signals $\delta_{IN}$ that designate positions of the control unit 1 between a position $\delta_L$ that is intermediate its $\delta_E$ and $\delta_G$ positions and a position $\delta_H$ that is spaced beyond the $\delta_G$ position in the increase direction. The gradient of this third sequence is in this case equal to the gradient $k_1$ of the second sequence. Further, as mentioned above, for a given input signal $\delta_{IN}$, the related output signal magnitude $F_{TQ}$ in the third sequence L'H' signifies a larger biasing force on the control unit 1 than the related output signal magnitude in the second sequence G'E'.

The line $y'_3$ represents one of a set of "trim" sequences of relationships between input and output signal magnitudes, similarly defined and stored in the system memory. The output signal magnitudes in each "trim" sequence are related to respective input signals $\delta_{IN}$ that designate positions of the control unit 1 between its $\delta_E$ position and its $\delta_H$ position. All of the "trim" sequences have like gradients or slopes that are in this case equal to the relatively steep gradient $k_3$ of the first sequence.

There is a "trim" sequence in the set for every output signal magnitude in each of the second and third sequences. Furthermore, each "trim" sequence includes an output signal magnitude that is in the second sequence (G'E') and a different output signal magnitude that is in the third sequence (L'H'); and these two output signal magnitudes, which can be considered identifier magnitudes, can be visualized as the points at which the "trim" sequence line $y'_3$ (or any "trim" sequence line parallel to it) intersects the respective line segments G'E' and L'H'.

As illustrated in FIG. 3, sequences of input signal to output signal relationships that are generally similar to those described above for the stick-back positions are also defined and stored for the stick-forward range.

As the method of this invention is practiced, information is temporarily stored that relates to the magnitude of each generated input signal and the magnitude of the output signal that was produced in response to it. Such information is employed in determining the magnitude of the output signal that is to be produced in response to the next generated input signal. After that next output signal is produced, the stored information can be discarded.

At this point it is to be observed that for input signals in the range of $\delta_E$ to $\delta_H$, produced output signals $F_{TQ}$ all fall within the modulation zone E'L'H'G'E'. Therefore, stored input-output information for stick positions in that range can always identify a particular one of the set of "trim" sequences $y'_3$. Thus, if the stored information designates an input-output pair $\delta_{IN}/F_{TQ}$ that can be visualized as falling on one of the line segments G'E' or L'H', then it denotes one of the identifier output signal magnitudes and accordingly identifies a particular one of the set of "trim" sequences. If on the other hand the stored $\delta_{IN}/F_{TQ}$ information designates a point which can be visualized as located between the line segments G'E' and L'H', then the stored information likewise designates a particular one of the "trim" sequences, since the $\delta_{IN}/F_{TQ}$ relationships in each "trim" sequence (other than those for the identifier $F_{TQ}$ magnitudes) are all unique to that particular sequence.

The method proceeds on an initial assumption that the output signal to be produced in response to a newly generated input signal is to have the magnitude which is related to that input signal in the "trim" sequence identified by the stored information for the last preceding input signal. In effect, therefore, the method assumes that the stored information about the last preceding $\delta_{IN}/F_{TQ}$ signal pair designates a turning point, and the analysis continues on the assumption that the output signal magnitude for the newly generated input signal is to be determined from the particular "trim" sequence identified by the stored information. Thus, in terms of FIG. 3, three possible points that might be designated by stored information would be point $T_1$ on the segment L'H', point $T_2$ on segment G'E', or point $T_3$ which is between segments L'H' and G'E' and which is unique to the particular "trim" sequence $y'_3$ illustrated in the diagram. In each of those cases the stored information unambiguously designates the illustrated "trim" sequence, and a presumptive $F_{TQ}$ value is to be assigned from that "trim" sequence and will be the output value magnitude therein that is related to the newly generated input signal.

In terms of FIG. 3, it is to be borne in mind that each "trim" sequence extends substantially to the left and to the right of the modulation area E'L'H'G'E', and therefore the presumptive output signal magnitude may fall within that area or may fall outside of it, either above it or below it. If the presumptive output signal magnitude falls within the area E'L'H'G'E', that is, if it is neither larger than the magnitude designated by $T_1$ nor smaller than the magnitude designated by $T_2$, then the presumptive output signal magnitude is adopted as the actual output signal magnitude to be produced in response to the newly generated input signal.

The point P in FIG. 3 illustrates a case in which the presumptive output signal magnitude falls outside the modulation zone E'L'H'G'E'. Assuming that $T_1$ is the point designated by the stored information, then the fact that the point P is outside (above) the modulation zone means that $T_1$ was not in fact a turning point, the stick has continued its movement in the increase direction, and the correct new output signal would be the one in the sequence L'H' that is related to the newly generated input signal. Similarly, a presumptive output signal magnitude below the sequence G'E' would signify a continued movement of the stick in the decrease direction, and the actual output signal magnitude would be the one in the G'E' sequence that is related to the newly generated input signal.

The initial assumption that the output signal for a newly generated input signal will be contained in an identifiable "trim" sequence applies to stick displacement within the inital range $\delta_O$–$\delta_E$, as well as to positions of displacement beyond that range, inasmuch as the first sequence, illustrated by segment OE', coincides with one of the "trim" sequences, and specifically comprises an extension of the "trim" sequence illustrated by segment E'L', which corresponds to the lower boundary of the modulation zone E'L'H'G'E'. Hence for input signals corresponding to stick positions within the range O-$\delta_E$ the actual output signal magnitude will be the same as the presumptive output signal magnitude.

Figure 4:
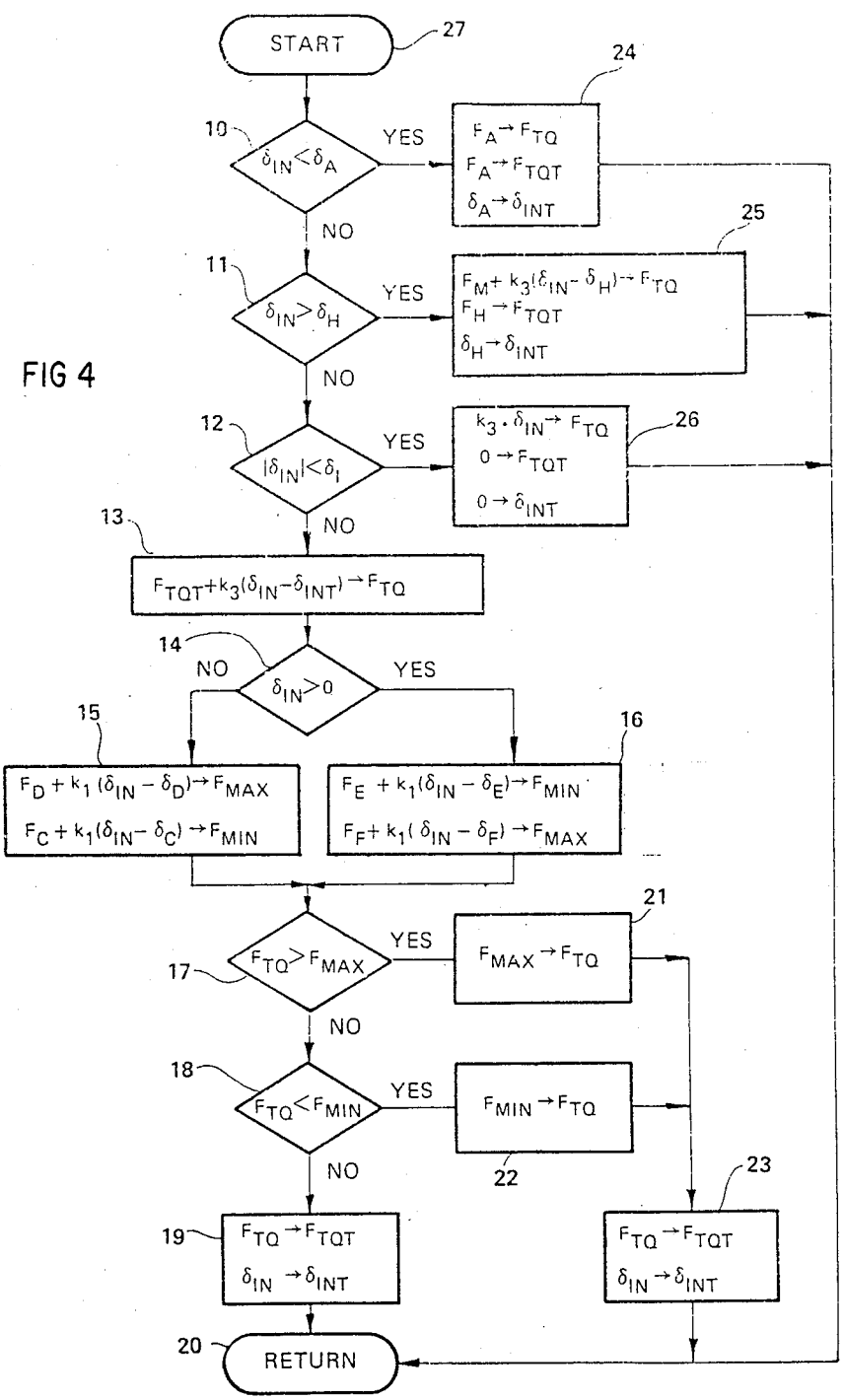
FIG. 4 is a flow diagram for an algorithm employed in the practice of the method of this invention.

The method of this invention will be more clearly understood from a consideration of the algorithm that is worked through for each newly generated input signal, illustrated in FIG. 4.

As illustrated by box 10, the newly generated input signal $\delta_{IN}$ is compared with the input signal magnitude $\delta_A$ for the forward limit of the stick-forward modulation zone A'B'D'C'A', to determine whether the newly generated $\delta_{IN}$ signal has a magnitude less than that compared $\delta_A$ magnitude. If it has—signifying that the stick is at or forward of the $\delta_A$ position—the output signal that is produced has the magnitude $F_A$ which is assigned to the $\delta_A$ input signal magnitude, as illustrated by the box 24. This output signal magnitude corresponds to a limit value of rearward biasing force upon the stick that is in this case imposed upon the stick in all of its positions in a small range near and at the front limit of its displacement. As is also denoted by the box 24, information concerning this input signal and the output signal magnitude produced in response to it is preserved, as $\delta_{INT}$ and $F_{TQT}$, respectively, for use in processing the next generated input signal.

If the magnitude of the newly generated input signal $\delta_{IN}$ is found not to be smaller than $\delta_A$ it is next compared (box 11) with an input signal magnitude $\delta_H$ that corresponds to a stick position denoted by the point $\delta_H$ in FIG. 3, to determine whether the stick is in a small rearmost range of its positions, between the modulation zone E'L'H'G'E' and its most rearward position, in which range a relatively high stick force gradient is almost invariably desirable. If it is found to be in that rearmost range, then the output signal produced in response to the newly generated input signal will be assigned from a fifth sequence of input/output signal relationships, illustrated by line segment y'$_5$ in FIG. 3, and which has a gradient k$_5$. This determination of the output signal is illustrated by the box 25. Again, information concerning the input and output signal magnitudes is preserved for use in processing the next input signal, as denoted by $\delta_{INT}$ and $F_{TQT}$ in box 25.

If the magnitude of the new input signal $\delta_{IN}$ is neither smaller than $\delta_A$ (box 10) nor larger than $\delta_H$ (box 11), then the absolute value of that input signal is compared with an input signal magnitude $\delta_1$, to determine whether the new input signal corresponds to a stick position in a level flight range that is near the null point O and between the ranges of stick positions in which the respective modulation zones are applicable. If the stick position is found to be within that level flight range, and is at the positive side of the null point, the output signal generated in response to the newly generated input signal will be determined according to the sequence illustrated in FIG. 3 by segment OE', as denoted by the box 26; and the stored information $\delta_{INT}$ for the input signal and $F_{TQT}$ for the output signal will correspond to the input and output signal magnitudes for the null position of the stick, as also shown in box 26. If the stick is at the negative side of the null position, the output signal can be determined in the same way but will of course have a negative sign in conformity with the negative sign of the input signal, since segment OD' is the negative counterpart of segment OE'.

If the process illustrated by boxes 10, 11 and 12 results in a determination that the control stick is not in any of the ranges tested for in that procedure, then it must be in one of the ranges of positions for which either the modulation zone A'B'D'C'A' or the modulation zone E'L'H'G'E' is applicable. Accordingly, as illustrated by box 13, there is assigned to the newly generated input signal, as a presumptive or tentative value of the output signal that will be produced for it, the output signal magnitude which is related to that input signal in the particular "trim" sequence identified by the stored information for the last preceding input signal.

Next, as illustrated by box 14, the magnitude of the newly generated input signal is compared with zero, to determine whether it represents a stick-forward position or a stick-back position. If greater than zero, signifying a stick-back position (as is here assumed) the next stage of processing takes place as illustrated by the box 16; otherwise an analogous procedure is followed as illustrated by the box 15.

Let it now be assumed that the point P in FIG. 3 designates the relationship between a newly generated input signal $\delta_{IN}$ and the presumptive output signal magnitude $F_p$ that is assigned to that input signal. That presumptive value is assigned because the stored information for the preceding input signal corresponds to point $T_1$, which identifies the "trim" sequence that includes the input-output relationship designated by point P. For this particular input signal $\delta_{IN}$, the related output signal magnitude $F_{MIN}$ in the third sequence (segment G'E') would have the value denoted by point N, and the related output signal magnitude $F_{MAX}$ in the second sequence (L'H') would have the value denoted by point M. Therefore N designates a minimum magnitude that the actually produced output signal shall have, and M denotes a maximum value for it. The determination of these maximum and minimum values for stick-back positions is illustrated by box 16, and the corresponding determination for stick-forward positions is illustrated by box 15.

Next, as illustrated by box 17, the presumptive output magnitude is compared with the maximum value $F_{MAX}$ just determined; and if it is greater than that compared magnitude, then, as illustrated by box 21, the actual output signal produced in response to the newly generated input signal has a magnitude equal to that maximum magnitude. This is the condition illustrated in FIG. 3, wherein the stick is in one of a succession of positions through which it has been moved in the increase direction. If the condition tested for in box 17 does not exist, the presumptive output signal magnitude is compared with the just-determined minimum magnitude $F_{MIN}$, as illustrated by box 18, and in this case if the assumed magnitude is less than the compared minimum magnitude, the produced output signal has that minimum magnitude.

Finally, if the assumed output signal magnitude is neither larger than the compared maximum magnitude nor smaller than the compared minimum magnitude, then an actual output signal is produced that has the same magnitude as the presumptive output signal. This last determination, which is illustrated in block 19, is made in a case such as is illustrated by point $T_3$ in FIG. 3, and, as explained above, occurs when the direction of stick displacement had been reversed, as at point $T_1$ or $T_2$, just prior to generation of the input signal being processed.

As designated by the return block 20, stored information for each input signal and the output signal produced in response to it is used for processing the next generated input signal.

In the particular system described above, the torque motor 5 is solely responsible for the biasing force that opposes displacement of the manipulatable unit. However, from a practical standpoint and for the sake of security it is suitable to employ, in cooperation with the torque motor or its equivalent, a spring (not shown) for generating a basic biasing force acting upon the control unit. That basic force, together with the force generated by the torque motor 5, then provides the total desired force, which will of course be in accordance with the force diagram in FIG. 3. The basic force due to the spring is designated in FIG. 3 by the broken line $F_S$. For such an installation the demand value signified by each output signal as actually produced will take account of the component of biasing force that the spring contributes. Accordingly, the gradient of the output signals applied to the torque motor would have a lower slope, and in the case illustrated in FIG. 3 the line segments L'H' and G'E' could be horizontal and have a zero slope.

A control system operating with a stick bias force control method of this invention, based on rectilinear sequences such as are illustrated in FIG. 3, has been successfully tested under actual flight conditions. The force gradient for fine control manipulations was about twice that for coarse control. The modulation zone had a breadth of about 2° of stick displacement. The test demonstrated an advantageous influence upon control performances and control activity of the pilot, with an improved stick force feel, especially for trimming manipulations.

Figure 5:
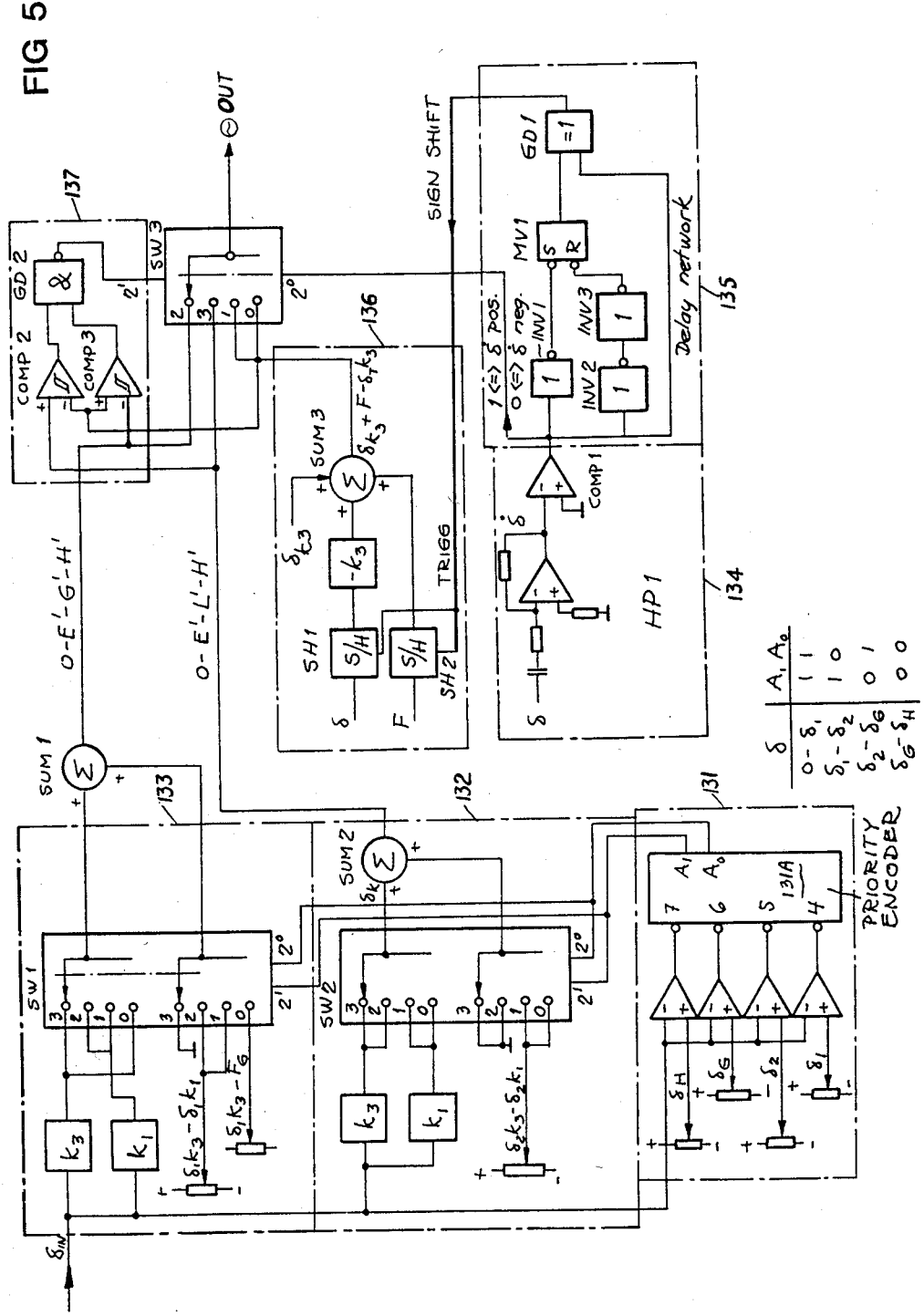
FIG. 5 diagrammatically depicts apparatus for practicing the invention with analog signals.

FIG. 5 schematically illustrates apparatus for practicing the method of this invention with an analog input $\delta_{IN}$, assumed to be a voltage having a value which at each instant signifies the existing position of the stick or control unit.

In apparatus signified by box 131, a determination is made of the particular part of its range (i.e., interval of its displacement) in which the stick or control unit 1 is positioned. This is done by comparing the magnitude of the existing $\delta_{IN}$ input with fixed voltages that are respectively equal to the inputs designated in FIG. 3 by $\delta_1$, $\delta_2$, $\delta_G$ and $\delta_H$. The results of these comparisons are fed to a priority encoder 131A, which produces a two-bit binary output, as shown in the table at the right of the block 131, that signifies the interval in which the stick is positioned.

The limit conditions depicted by the curve OE'L'H' in FIG. 3 are generated in the apparatus illustrated by box 132 in FIG. 5, irrespective of whether the stick is moving in the increase direction or in the decrease direction. The limit conditions depicted by the curve OE'G'H' are generated in a similar manner by the apparatus illustrated by box 133. Considering the box 132, the boxes inside it that are designated by $k_3$ and $k_1$ respectively designate multiplication of the input magnitude $\delta_{IN}$ by the gradient $k_3$ (corresponding to the slope of line segments OE' and E'L' in FIG. 3) and by the gradient $k_1$ (corresponding to the slope of the line segment L'H'). The applicable product $\delta_K$ is selected by the analog multiplexer switch SW2, which is controlled by the output of the priority encoder, and is fed to one input terminal of an adder or summing junction SUM2. The apparatus illustrated in box 132 also produces a fixed voltage corresponding to an off-set value which compensates for the fact that the line segment L'H', if extended, would not pass through the null position. When applicable, that fixed voltage is also selected by the switch SW2 under the control of the output from the priority encoder and is fed to the other input terminal of the summing junction SUM2, the output of which thus corresponds to the output magnitude on the line segment O'E', E'L' or L'H', as the case may be, that is related to the then-existing input magnitude.

In like manner the apparatus illustrated by box 133 and its cooperating summing junction SUM1 produces an output that corresponds to the output magnitude on the line segment OE', E'G' or G'H', as the case may be, that is related to the then-existing input magnitude; and it does this irrespective of whether the stick is moving in the increase or in the decrease direction.

The determination of the direction in which the stick is being moved is made by apparatus illustrated by box 134, which comprises a high-pass filter HP1 to which the input $\delta_{IN}$ is fed and which produces the derivative $\dot{\delta}$ of that input. That derivative is fed to a comparator COMP1 which produces a positive output if the stick is moving in the increase direction and a negative output if it is moving in the decrease direction.

The output from the comparator COMP1 is fed to apparatus illustrated by box 135, which comprises inverters INV1, INV2 and INV3, a set-reset flip-flop MV1, and an exclusive-OR gate GD-1. The output of the flip-flop MV1 is fed to one input terminal of the exclusive-OR gate GD1, where it is compared to the uninverted output of the comparator COMP1, which is connected with the other input terminal of that gate. If there is a change in the sign of the output from comparator COMP1, signifying a turning point or reversal of direction of stick movement, a short sign-shift pulse is issued by the exclusive-OR gate GD1. The inverters INV1, INV2 and INV3 are so connected that a negative output from the comparator COM1 sets the flip-flop MV1, so that it produces a "one" output, and a positive output from that comparator resets the flip-flop so that it produces a "zero" output. The circuit comprising the inverters and the flip-flop serves as a delay network, the delay in which determines the duration of the sign-shift pulse.

As pointed out hereinabove, a reversal of the direction of stick movement, in particular, calls for the making of comparisons with stored information about input magnitude and output magnitude. Accordingly, the apparatus illustrated by box 136 comprises a pair of sample-and-hold circuits, one designated SH1 for the $\delta_{IN}$ magnitude, the other designated SH2 for the $F_{TQ}$ magnitude, which is fed back from the output of the signal processing apparatus. Both of these sample-and-hold circuits are rendered operative by a sign-shift pulse from the exclusive-OR gate GD1.

From what has been said above it will be understood that the information stored in the sample-and-hold circuits SH1 and SH2 identifies a point that is either in the modulation zone E'L'H'G'E' or on the short line segment OE'; and in either case it thus also defines a "trim" sequence line which passes through that point and has the slope $k_3$. For the newly-existing magnitude $\delta_{IN}$ of the input, the related magnitude $F_{TQ}$ of the output on that defined line is given in terms of the stored input magnitude $\delta_{INT}$ and stored output magnitude $F_{TQT}$ by:
$\delta_{IN} k_3 + (F_{TQT} - \delta_{INT} k_3)$.

An output corresponding to the existing input magnitude $\delta_{IN}$ multiplied by the slope or gradient characteristic $k_3$ is available from the apparatus designated by either of the boxes 132 or 133 and is applied to one input terminal of the summing junction SUM3. An input corresponding to the stored output magnitude $F_{TQT}$, from the sample-and-hold circuit SH2, is applied to another input terminal of the summing junction SUM3. From the sample-and-hold circuit SH1 an output corresponding to the stored input magnitude $\delta_{INT}$ is multiplied by the negative value of the slope characteristic $k_3$, and the product of this multiplication is applied to the third terminal of the summing junction SUM3. The output from that summing junction thus corresponds to a presumptive value of the output magnitude $F_{TQ}$.

At this point it will be seen that three possible output magnitudes are available for a given input magnitude $\delta_{IN}$ that follows a turning point, one at the output terminal of each of the summing junctions SUM1, SUM2 and SUM3. The selection from among these possibilities is made by the apparatus denoted by box 137, which comprises two comparators COMP2 and COMP3 that receive inputs from the several summing junctions and have their respective output terminals connected with respective input terminals of an AND-gate GD2. The summing junctions SUM1, SUM2 and SUM3 also have their respective output terminals connected to respective input terminals 2, 3 and 1 of a function switch SW3 that is controlled by the AND-gate GD2. The comparators COMP2 and COMP3 are of the Schmitt trigger type, to prevent unnecessary function changes in the function switch SW3.

The output of the summing junction SUM1 (which corresponds to the output magnitude on the "decrease" curve OE'G'H' that is related to the existing input $\delta_{IN}$) is fed to one input terminal of the comparator COMP3, and the output of the summing junction SUM2 (corresponding to the output magnitude on the "increase" curve OE'L'H' that is related to the existing input $\delta_{IN}$) is fed to one input terminal of the comparator COMP2. The other input terminal of each of those comparators COMP2, COMP3 is connected with the output terminal of the summing junction SUM3.

If the input from summing junction SUM3 to comparator COMP2 is larger than the input to that comparator from summing junction SUM2, comparator COMP2 produces a "one" output; otherwise it produces a "zero" output. If the input from summing junction SUM3 to comparator COMP3 is smaller than the input to that comparator from summing junction SUM1, comparator COMP3 produces a "one" output; otherwise it produces a "zero" output. With "zero" inputs to both of its input terminals, AND-gate GD2 produces a "zero" output and sets the function switch SW3 to either of its input terminals 1 or 0, both of which are connected to the output of summing junction SUM3, so that the produced output magnitude $F_{TQ}$ is the "trim" output generated at summing junction SUM3.

If the output of the AND-gate GD2 is "one", the output from function switch SW3 will be taken either from its terminal 2 or its terminal 3, depending upon whether the output of comparator COMP1 is negative or positive. The output of that comparator is also fed to the function switch SW3 for control of it, so that with stick movement in the decrease direction the output $F_{TQ}$ follows the curve OE'G'H' and with stick movement in the increase direction the output $F_{TQ}$ follows the curve OE'L'H'.

From the foregoing explanation it will be seen that when the method of this invention is applied to a control system with a manipulatable control unit that is biased to a neutral position and a controlled device that is actuated in response to displacements of the control unit, the biasing force applied to the control unit has a low gradient when that unit is moved through a substantially large continuous displacement in either direction or through a succession of small displacements that are all in the same direction, but has a high gradient that facilitates fine control when there has been a change in the direction of displacement of the control unit, and particularly during a small displacement immediately following such a change in direction. As a result, the operator can obtain more precise and suitable movements of the controlled device, and hence better control performance than was possible heretofore. The locally heightened force gradient, provided for by the "trim" sequences, is brought into effect in any position of the control unit within the range of positions to which the "trim" sequences apply. The method is easily put into practice, is not impaired by time dependent side effects, and reduces the risk of operator-induced oscillations.

What is claimed as the invention is:

1. A method for a control system comprising a manipulatable control unit displaceable from and toward a null position in increase and decrease directions respectively, a controlled device actuated to move to positions that substantially correspond to the positions of displacement of said control unit, and force generating means for imposing a yielding biasing force upon said control unit that urges it in said decrease direction, said method providing for control of the force generating means to cause said biasing force to have a higher gradient for trimming displacements of said control unit than for maneuvering displacements of said control unit, and said method being characterized by:

A. generating input signals at regular intervals, each having a magnitude signifying the existing position of displacement of said control unit;

B. producing an output signal for each input signal, each output signal having a magnitude which signifies a magnitude of said biasing force;

C. defining a pair of sequences of output signal magnitudes (1) the output signal magnitudes of one of said sequences being related to respective input signals that designate positions of said control unit between a first position and a second position spaced from said first position in said increase direction, (2) the output signal magnitudes of the other of said sequences being related to respective input signals that designate positions of said control unit between a third position, intermediate said first and second positions, and a fourth position spaced in said increase direction from the second position, and (3) said output signal magnitudes in each of said sequences having a first substantially low gradient of increase in said increase direction relative to their related input signals but being so related that for a given input signal the output signal magnitude in said one sequence signifies a smaller biasing force than the output signal magnitude in said other sequence;

D. defining a set of trim sequences of output signal magnitudes
   (1) related to respective input signals that designate positions of said control unit between said first and fourth positions,
   (2) all of said trim sequences having like gradients substantially steeper than said first gradient,
   (3) there being a trim sequence in said set for each output signal magnitude in each of said one and said other sequences, and
   (4) each trim sequence including a magnitude that is in said one sequence and a different magnitude that is in said other sequence, each of which magnitudes has a unique relationship to its related input signal whereby the trim sequence is identifiable;
E. for each produced output signal, storing information related to
   (1) the magnitude of that output signal magnitude and
   (2) the input signal for which it was produced whereby a trim sequence is identifiable;
F. for each generated input signal that designates a position of said control unit between said first and said fourth positions,
   (1) assigning as a presumptive output signal magnitude the magnitude that is related to that input signal in the trim sequence identified by stored information for the last previously produced output signal,
   (2) comparing said presumptive output signal magnitude with the respective magnitudes in said one sequence and in said other sequence that are related to the generated input signal, and
      (a) if the presumptive magnitude is equal to or larger than the compared magnitude in said one sequence, producing an output signal having that compared magnitude,
      (b) if the presumptive magnitude is equal to or smaller than the compared magnitude in said other sequence, producing an output signal having that compared magnitude, and
      (c) if the presumptive magnitude is larger than the compared magnitude in said other sequence and smaller than the compared magnitude in said one sequence, producing an output signal having said presumptive magnitude as its magnitude; and
G. so imposing said output signals upon said force generating means that said biasing force at each instant substantially corresponds to the magnitude of the most recently produced output signal.

2. A control system comprising a manipulatable control unit displaceable from and toward a null position, input signal generating means connected with said control unit for generating input signals at regular intervals, each having a magnitude that signifies the existing position of displacement of the control unit, actuating means responsive to actuating signals derived from said input signals to actuate a controlled device in substantial correspondence with displacements of the control unit, and biasing means for imposing a force upon the control unit whereby it is yieldingly urged to the control unit null position, said control system being characterized by:
A. output signal generating means, connected with said input signal generating means and comprising memory means and logic means, for producing for each newly generated input signal an output signal having a magnitude which signifies a magnitude of said force and which depends upon
   (1) information stored in said memory means concerning said magnitudes of the immediately preceding input signal and of the output signal produced for that input signal, and
   (2) a predetermined program whereby said logic means determines said magnitude of the output signal for said newly generated input signal in accordance with a relationship between the magnitude of that input signal and said stored information; and
B. said biasing means comprising variable force generating means responsive to said output signals and connected with the control unit to impose upon the control unit a force which at each instant has the magnitude signified by said magnitude of the output signal for the newly generated input signal.

3. A method for a control system comprising a manipulatable control unit displaceable from and toward a null position in increase and decrease directions respectively, a controlled device actuated to positions that substantially correspond to the positions of displacement of said control unit, and force generating means for imposing a yielding biasing force upon said control unit that urges the same in said decrease direction, said method providing for control of the force generating means to cause said biasing force to have a higher gradient for trimming displacements of said control unit than for maneuvering displacements thereof, said method being characterized by:
A. generating an input having a magnitude which at each instant designates the existing position of displacement of said unit from its null position;
B. producing an output having a variable magnitude which at each instant signifies the magnitude of said biasing force;
C. varying said magnitude of said output when said unit is displaced in each of said directions while said unit is in a predetermined range of its positions of displacement in which it is spaced in said increase direction from said null position, such variation being dependent as follows upon the direction in which the unit is being displaced and the distance of said unit from a turning point to which it was brought by its last preceding displacement in the opposite direction:
   (1) during every displacement of said unit through no more than predetermined distance from a turning point, varying said magnitude of the output in accordance with a first gain relationship between input and output magnitudes;
   (2) during displacement of said unit in the increase direction when it is beyond said predetermined distance from a turning point, increasing said magnitude of the output in accordance with a second gain relationship between input and output magnitudes having a substantially lower gradient than said first gain relationship;
   (3) during displacement of said unit in the decrease direction when it is beyond said predetermined distance from a turning point, decreasing said magnitude of the output in accordance with a third gain relationship
      (a) which has a gradient on the order of that of said second gain relationship but
      (b) wherein the output magnitude related to each position of displacement of said unit signifies a smaller magnitude of said biasing force than the output magnitude of the second gain relationship that is related to the same position of said unit; and D. so imposing said output upon said force generating means that said biasing force at each instant has substantially the magnitude signified by the magnitude of the output then produced.

4. The method of claim 3 wherein said input comprises input signals generated at substantially regular intervals, each having a magnitude signifying the existing position of displacement of said control unit, and said output comprises an output signal for each input signal, further characterized by:

E. defining a pair of sequences of output signal magnitudes,
   (1) the output signal magnitudes of one of said sequences
      (a) being related to respective input signals that designate positions of said control unit between a first position, at the end of said range that is proximal to said null position, and a second position in said range that is spaced in said increase direction from said first position and
      (b) having said third gain relationship to their related input signal magnitudes,
   (2) the output signal magnitudes of the other of said sequences
      (a) being related to respective input signals that designate positions of said control unit between a third position in said range, intermediate said first and second positions, and a fourth position that is at the end of said range remote from the null position, and
      (b) having said second gain relationship to their related input signal magnitudes;

F. defining a set of trim sequences of output signal magnitudes
   (1) related to respective input signals that designate positions of said control unit between said first and fourth positions,
   (2) the output signal magnitudes in each of said trim sequences having said first gain relationship to their related input signals,
   (3) there being a trim sequence in said set for each output signal magnitude in each of said one and said other sequences, and
   (4) each trim sequence including a magnitude that is in said one sequence and a different magnitude that is in said other sequence, each of which magnitudes has a unique relationship to its related input signal whereby the trim sequence is identifiable;

G. for each produced output signal, storing information related to
   (1) its magnitude and
   (2) the input signal for which it was produced whereby a trim sequence is identifiable;

H. for each generated input signal that designates a position of said control unit between said first and said fourth positions,
   (1) assigning as a presumptive output signal magnitude its related magnitude in the trim sequence identified by stored information for the last previously produced output signal,
   (2) comparing said presumptive output signal magnitude with the respective magnitudes in said one sequence and in said other sequence that are related to the generated input signal, and
      (a) if the presumptive magnitude is equal to or smaller than the compared magnitude in said one sequence, producing an output signal having that compared magnitude,
      (b) if the presumptive magnitude is equal to or larger than the compared magnitude in said other sequence, producing an output signal having that compared magnitude, and
      (c) if the presumptive magnitude is larger that the compared magnitude in said one sequence and smaller than the compared magnitude in said other sequence, producing an output signal having said presumptive magnitude as its magnitude.

5. The method of claim 3 wherein said control unit is displaceable to opposite sides of its said null position and at each said side thereof is displaceable in increase and decrease directions that are respectively from and toward said null position, further characterized in that a yielding biasing force upon said control unit at each said side of the null position whereby it is urged in said decrease direction, and wherein said predetermined range of positions is substantially duplicated, there being one such range at each said side of the null position.

6. The method of claim 3, further characterized by: when said unit is between its said null position and said range, and during every displacement of said unit in each said direction, varying said magnitude of the output in accordance with a gain relationship between input and output magnitudes that is on the order of said first gain relationship.

* * * * *